May 17, 1927.
M. JUHASZ
1,629,342
VEHICLE SIGNALING SYSTEM
Filed May 5, 1925
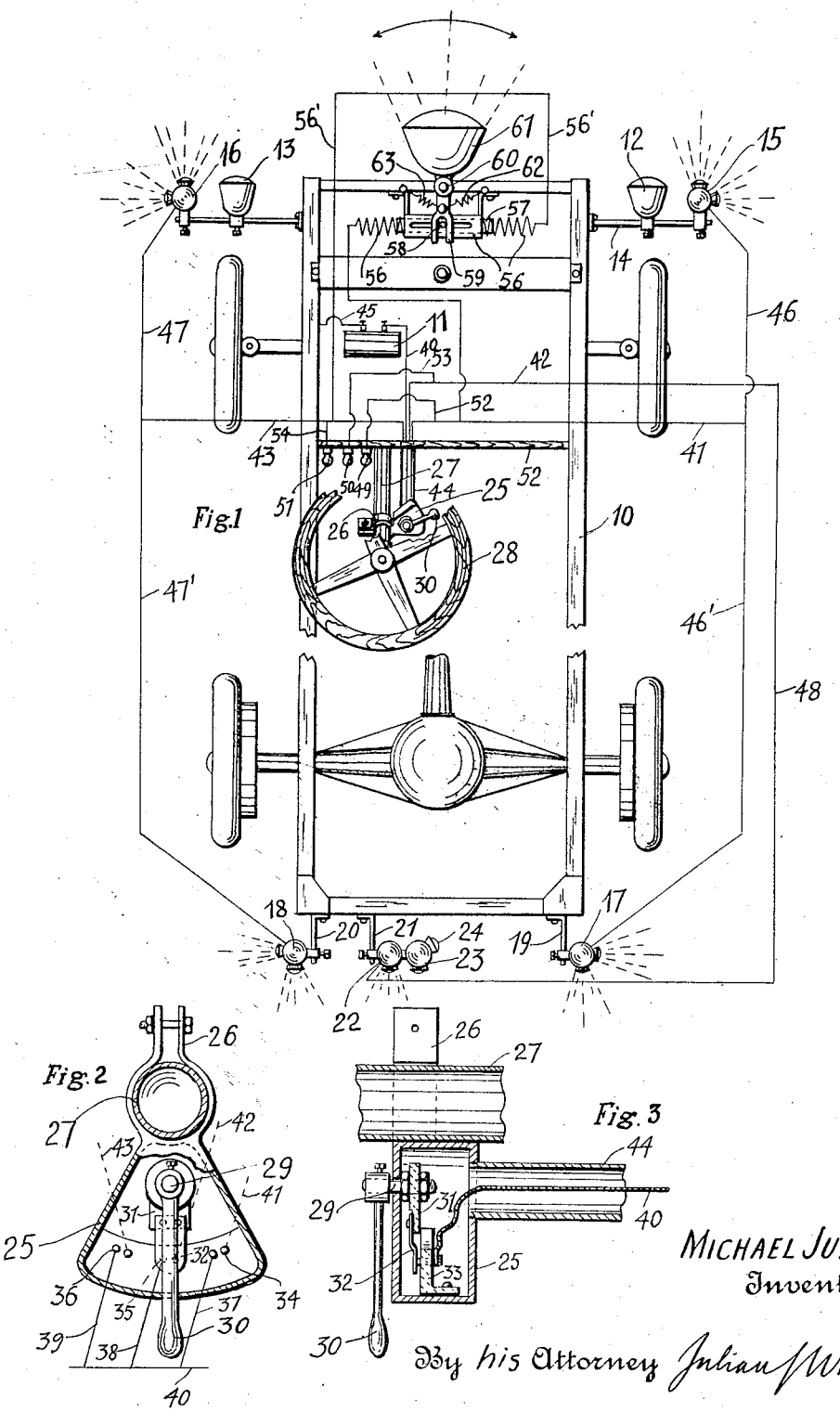
Michael Juhasz
Inventor
By his Attorney Julian Wittal Patented May 17, 1927.

1,629,342

UNITED STATES PATENT OFFICE.

MICHAEL JUHASZ, OF DOVER, OHIO.

VEHICLE SIGNALING SYSTEM.

Application filed May 5, 1925. Serial No. 28,256.

This invention relates to improvements in vehicle signals, particularly to signals used with automobiles, for indicating an intended turn etc., and it is the principal object of the invention to provide a signaling system conveniently operated from the steering wheel of a car to unmistakably indicate any intended turn by signals visible from all sides.

Another object of the invention is the provision of a vehicle signal of this character which is of a simple and inexpensive construction, yet efficiently and positively operating.

A further object of the invention is the provision of a signaling system including means for controlling a headlight to illuminate the street or road into which a vehicle is about to turn before the turn is made.

A still further object of the invention is the provision of a plurality of control lights on the instrument board of a car equipped with a signaling system according to the present invention.

These and other objects and advantages of the invention will become more fully known as the description proceeds, and will then be specifically defined in the appended claims.

In the accompanying drawing, forming a material part of this disclosure,

Fig. 1 is a diagrammatic top plan view of a car equipped with a signaling system according to the invention.

Fig. 2 is a sectional detail front view of a switch used with the signaling system according to my invention.

Fig. 3 is a sectional detail side elevation of the switch.

At a convenient place of the automobile frame, generally designated 10, a source of electricity 11 is located, which is adapted to furnish the current for the operation of the signal lamps.

Such signal lamps are located at the front, in juxtaposition to the ordinary head light 12 and 13 on a bar 14 which also carries the signal lamps 15 and 16, and may be equipped with glasses of any color desired or prescribed by city regulation for this purpose. It will be clear that these lamps may also be arranged in superposition to the ordinary original lamps, or in any other suitable manner.

Another pair of signal lamps, 17 and 18, is secured by means of brackets 19 and 20 to the rear end bar of the car frame which also carries a bracket 21 and the lamp 22 to indicate the stop, while in juxtaposition to it but independently thereof, the normal red rear lamp 23 is attached to the bracket 21 having a white glass globe 24 for the illumination of the license plate, etc.

The lamps are located in circuits in which is also located a switch having its casing 25 clamped by means of bands 26 to the steering post 27 of the car, carrying the customary steering wheel 28.

The switch comprises a stub shaft 29 extending into the casing 25, and having attached at its outer end an operating handle 30. The shaft 29 carries within the casing a plate 31 of insulating material to which is attached a contact maker 32. An insulator plate 33 is also attached to the inner wall of the casing, carrying a plurality of contacts arranged in groups, 34, 35 and 36. To one circuit of each group are attached the circuit wires 37, 38 and 39, leading to a common conductor 40. To the other contact of each group are connected circuit wires or conductors 41, 42 and 43. The conductor 40 is encased in a branch pipe 44, and leads to one pole of the source of electricity 11, the other pole of which is grounded by wire 45 leading to the car frame.

The front signal lamps 15 and 16 are connected by wires 46 and 47 to the switch wires 41 and 42, respectively, and to the rear lamps 17 and 18 by wires 46' and 47', respectively. The rear stop light 22 is connected by means of a wire 48 to the wire 42 of the switch 25. Lamps 23 and 24 are independently connected to the car light circuit.

Signal lamps 49, 50, and 51 are attached to the instrument board 52 of the car and by means of wires 53, 54 and 55 to the respective switch wires.

In my two side signal circuits are also located two solenoids 56 having a sliding core 57, carrying a pin 58 engaging between the prongs of a fork 59 having its shank pivoted intermediate its ends, as at 60, to the front bar of the car frame, and carrying at its front end a head search light 61. This device is kept in its central position by the springs 62 and 63. My device operates as follows:

If the operator of a car desires to make a turn to the left he throws the switch lever to connect contacts 36 with the battery 11, and a circuit will be closed over wires 47 and 43, the switch, and wire 40, to the battery 11. If a turn to the right is desired, the switch is thrown to connect the set of contacts 34, and a circuit will be closed over wires 46 and 41, the switch, and wire 40 to the battery 11. If the rear light 22, indicating stop, is to be illuminated, the switch is operated to connect the contacts 35, so that a circuit is closed over wires 48, 42, the switch, and wire 40, to the battery 11.

Simultaneously with the closing of one or the other of the above circuits for illuminating the right or left signal lights the respective opposite solenoid will be energized through the respective wires 56 and the ground, and turns the head search lamp 61 to the desired direction, in order to illuminate the road into which the car is about to turn, so that the driver can safely make the turn.

It will be clear that changes may be made in the general arrangement, and in the construction of the minor details of my invention without departure from the scope or the spirit thereof, as defined in the appended claims.

Having thus described my invention, what I claim as new and desire to secure by Letters Patent, is:

1. In a vehicle signal system, a vehicle, right and left turn signals, a circuit for each signal, means for selectively energizing said circuits to indicate a contemplated turn, a roadway illuminating lamp, means for mounting said lamp on said vehicle for movement in either direction from normal position, illuminating the roadway straight ahead, means operated by energization of either of said signal circuits for moving said lamp to illuminate the roadway in the direction of the contemplated turn, and means for returning said lamp to its normal position.

2. In a vehicle signal system, a vehicle, right and left turn signals, a circuit for each signal, means for selectively energizing said circuits to indicate a contemplated turn, a roadway illuminating lamp, means for mounting said lamp on said vehicle for movement in either direction from normal position, illuminating the roadway straight ahead, said means comprising a forked shank on the lamp mounted in swivelled relation on a pin of the vehicle frame, and opposed solenoids in connection with said right and left handed signal circuits, respectively, said solenoids having a common core with a pin to engage the forked end of the shank on the lamp.

3. In a vehicle signal system, a vehicle, right and left turn signals, a circuit for each signal, means for selectively energizing said circuits to indicate a contemplated turn, a roadway illuminating lamp, means for mounting said lamp on said vehicle for movement in either direction from normal position, illuminating the roadway straight ahead, means operated by energization of either of said signal circuits for moving said lamp to illuminate the roadway in the direction of the contemplated turn, said means comprising opposed solenoids having a common core with a pin to engage a shank on the lamp.

4. In a vehicle signal system a vehicle, right and left turn signals, a circuit for each signal, means for selectively energizing said circuits to indicate a contemplated turn, a roadway illuminating lamp, means for mounting said lamp on said vehicle for movement in either direction from normal position, illuminating the roadway straight ahead, means operated by energization of either of said signal circuits for moving said lamp to illuminate the roadway in the direction of the contemplated turn, means for returning said lamp to its normal position, said means comprising opposed springs attached to a shank piece on the lamp.

Signed at Dover, in the county of Tuscarawas and State of Ohio, this 4th day of April, A. D. 1925.

MICHAEL JUHASZ.